Dec. 23, 1930.  H. L. WATSON  1,786,375
ANIMAL HOPPLE
Filed April 23, 1929  2 Sheets-Sheet 1
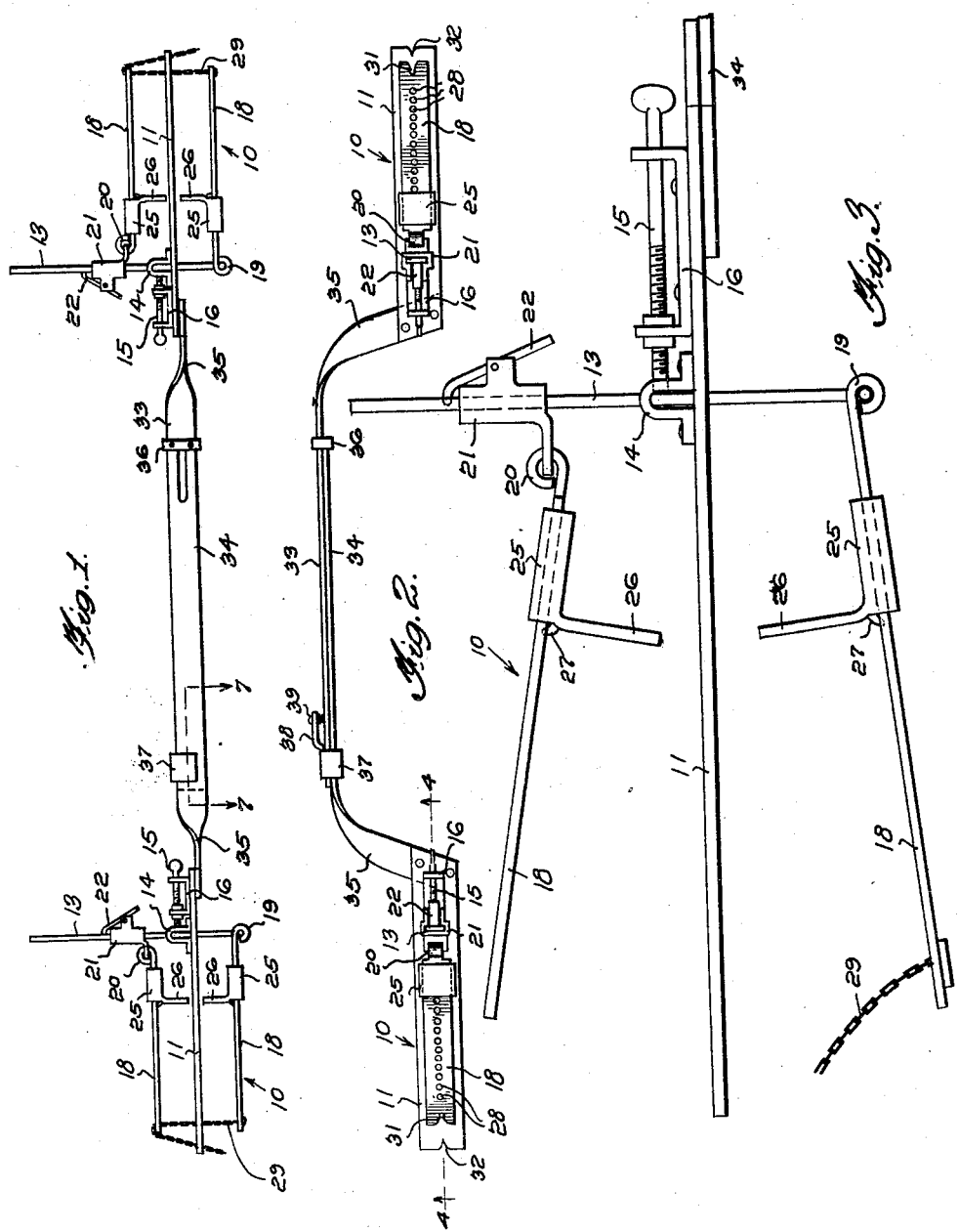
INVENTOR.
HARVEY L. WATSON,
BY *Jerry A Mathews*
ATTORNEY.

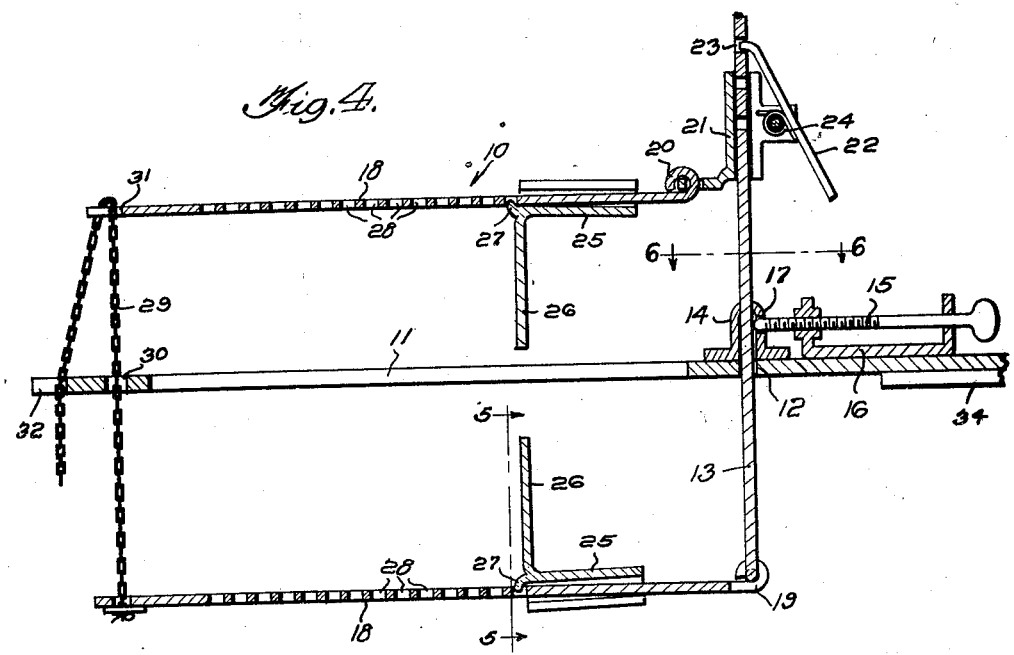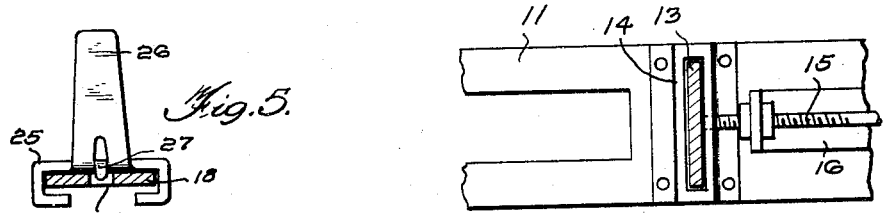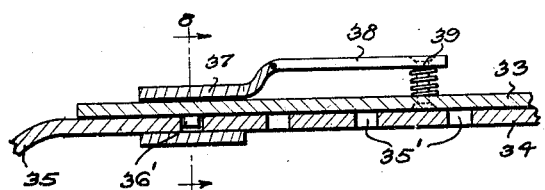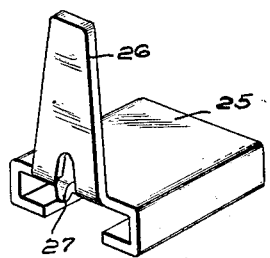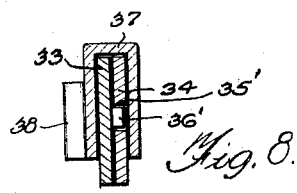

Patented Dec. 23, 1930

1,786,375

UNITED STATES PATENT OFFICE

HARVEY LOUIS WATSON, OF MOUNT PLEASANT, IOWA

ANIMAL HOPPLE

Application filed April 23, 1929. Serial No. 357,511.

My invention relates to an animal hopple adapted for holding hogs or other animals.

In accordance with my invention, I provide a pair of leg holding members, which are preferably connected by means of a longitudinally adjustable bar, so that the device may be adjusted to fit hogs or the like, of different lengths. The leg holding members are adjustable longitudinally and transversely to properly engage with the legs of the hog. The device is easy to use and may be readily adjusted.

In the accompanying drawings, forming a part of this specification, and in which like numerals are employed to designate like parts throughout the same.

Figure 1 is a plan view of a hopple embodying my invention,

Figure 2 is a side elevation of the same,

Figure 3 is an enlarged plan view of a pair of the leg holding members,

Figure 4 is a central vertical longitudinal section through one pair of the leg holding members taken on line 4—4 of Figure 2, Figure 5 is a transverse section taken on line 5—5 of Figure 4, Figure 6 is a detailed horizontal section taken on line 6—6 of Figure 4, Figure 7 is a longitudinal section taken on line 7—7 of Figure 1, Figure 8 is a transverse section taken on line 8—8 of Figure 7, Figure 9 is a perspective view of one of the adjustable jaws.

In the drawings, wherein for the purpose of illustration, is shown a preferred embodiment of my invention, the numeral 10 designates pairs of adjustable leg holding members, which are identical. Each pair of leg holding members embodies an intermediate bar 11, which is longitudinally disposed, and has a transverse opening 12, near its inner end, for receiving a transverse slidable or adjustable bar 13. This bar is also slidable through an opening formed in a bracket 14, which is welded or otherwise rigidly attached to the bar 11. The transverse bar 13 is clamped or locked in the selected or adjusted position by means of a set screw 15, having screw-threaded engagement within a bracket 16, which is rigidly attached to the inner end of the bar 11. The end of the set screw passes through an opening 17, and contacts with the transverse bar 13.

The numeral 18 designates a pair of longitudinally extending sides, one of which is hinged to one end of the transverse bar 13, as shown at 19. The other side 18 is hinged, as shown at 20, to a slide or carriage 21, longitudinally adjustable upon the transverse bar 13. This slide or carriage is equipped with a pivoted dog 22, the free end of which is adapted to engage in selected openings 23, formed in the transverse bar 13. The dog has its free end forced toward the openings by means of a spring 24. The sides 18 are arranged upon opposite sides of the inner or intermediate bar 11, and one side 18 may be adjusted toward or away from the bar 11, by adjusting the transverse bar 13 and the other side 18 may be adjusted toward or away from the bar 11 by adjusting the carriage 21, upon the transverse bar 13. Both sides 18 having hinged supports may be swung inwardly toward the inner bar 11.

Slidably mounted upon the sides 18 are carriages 25, carrying inwardly projecting jaws 26. Stamped from the carriages 25 are tongues 27, adapted to enter openings 28, formed in the sides 18. There is sufficient space between the top and bottom walls of the carriage 25, and the sides 18, whereby when the jaws 26 are tilted toward the transverse bar 13, the tongues 27 will be withdrawn from the openings 28, whereby the carriages may be longitudinally adjusted upon the sides 18. When the jaws 26 are pressed outwardly, as by engagement with the legs of the hog, the carriages 25 are tilted in an opposite direction, whereby the tongues 27 enter the openings 28, and the carriages are locked in adjustment at the selected position.

One side 18 has suitable connection with a flexible element or chain 29, passing through an opening 30, formed in the inner bar 11, and this chain is adapted to be detachably locked in a notch 31, formed in the side 18. The free end of the chain may be held within a notch 32, formed in the inner bar 11.

The inner end of the inner bars 11 are riveted or otherwise rigidly attached to longitudinal bars 33 and 34, through the medium of offset portions 35. The bar 34 carries a guide 36, rigidly attached to its free end, and slidably receiving the bar 33. The bar 34, Figure 7, is provided with longitudinally spaced openings 35', adapted to receive a stud 36', rigidly attached to the bar 33. The bars 33 and 34 may be separated sufficiently to permit the stud 36' to be withdrawn from the openings 35', for longitudinally adjusting the bars 33 and 34, after which the stud 36' may be again inserted in a selected opening 35. The bars 33 and 34 are locked against spreading movement, adjacent to the free end of the bar 33, by means of a U-shaped keeper 37, adapted to receive the bars, and this keeper is carried by an arm 38, pivotally connected with the bar 33, as shown at 39.

In the use of the hopple, the bars 33 and 34 are first longitudinally adjusted to bring the pairs of leg holding members 10 in the proper longitudinal adjustable positions. The transverse bar 13 may now be adjusted so that one side 18 will occupy a proper relation to the inner bar 11, the other side 18 being adjusted by sliding the carriage 21. The sides 18 are now swung to the open positions, and the legs of the hog are placed upon opposite sides of the inner bar 11, and the sides 18 returned to the generally closed position. The jaws 26 are now slid inwardly until they firmly engage with the legs of the hog, this pressure causing the tongues 27 to lock within the openings 28. The sides 18 are now brought into firm engagement with the legs by the proper manipulation of the chains 29.

It is to be understood that the form of my invention, herewith shown and described, is to be taken as a preferred example of the same, and that various changes in the shape, size and arrangement of parts, may be resorted to without departing from the spirit of my invention, or the scope of the subjoined claims.

Having thus described my invention, I claim:—

1. In an animal hopple, pairs of leg holding members, each pair comprising an inner bar, a transverse adjustable bar carried by the inner bar, sides adjustably mounted upon the transverse bar, jaws carried by the sides, means connecting said sides, and means connecting said pairs of members.

2. In an animal hopple, pairs of leg holding members, each pair comprising an inner bar, a transverse adjustable bar carried by the inner bar, sides pivotally mounted upon the transverse bar, jaws carried by said sides, adjustable means connecting the sides in each pair, and means connecting said pairs of members.

3. In an animal hopple, pairs of leg holding members, each pair comprising an inner bar, a transverse adjustable bar carried by the inner bar, a side pivotally mounted upon the transverse bar, a carriage slidably mounted upon the transverse bar, a second side pivotally connected with the carriage, jaws adjustably mounted upon said sides, adjustable means connecting said sides, and means connecting said pairs of members.

4. In an animal hopple, pairs of leg holding members, each pair comprising a longitudinal bar, a transverse adjustable bar carried by the longitudinal bar, a side hinged to the transverse bar, a carriage slidably mounted upon said transverse bar, a second side pivotally mounted upon the carriage, carriages slidably mounted upon said sides, and carrying jaws, means whereby the last named carriages may be locked in adjustment upon said sides, means adjustably connecting the ends of said sides, and means connecting said pairs of members.

5. In an animal hopple, a pair of leg holding members comprising an inner bar, a transverse bar carried by the inner bar, sides pivotally mounted upon the transverse bar, jaws longitudinally adjustably mounted upon said sides and adjustable means connecting the free end portions of said sides.

6. In an animal hopple, a pair of leg holding members comprising an inner bar, a transverse bar adjustably mounted upon the inner bar, a side pivotally connected with the transverse bar to swing toward and away from the inner bar, a second side, a carriage longitudinally adjustably mounted upon the transverse bar and pivotally supporting the second side, said sides being disposed upon opposite sides of the inner bar, jaws mounted upon said sides and projecting forwardly toward the inner bar, and a flexible element adjustably connecting the ends of said sides and engaging the inner bar.

In testimony whereof I affix my signature.

HARVEY LOUIS WATSON.